March 26, 1968 W. OEHLER ET AL 3,375,089

STEEL STUDS

Filed June 17, 1965 2 Sheets-Sheet 1

INVENTORS
Werner Oehler
Werner Müller
By
Walter Becker

March 26, 1968 W. OEHLER ET AL 3,375,089
STEEL STUDS
Filed June 17, 1965 2 Sheets-Sheet 2
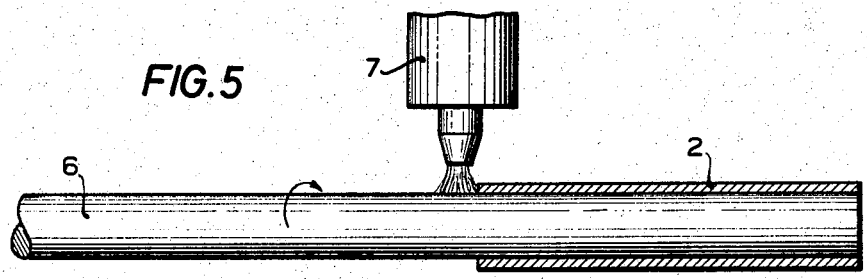
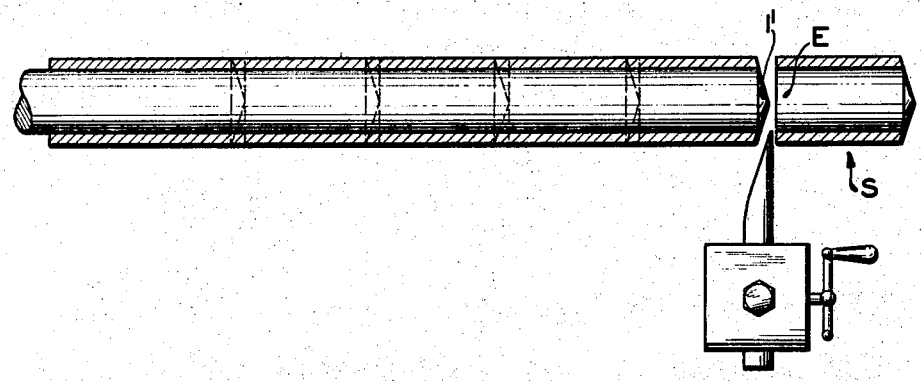
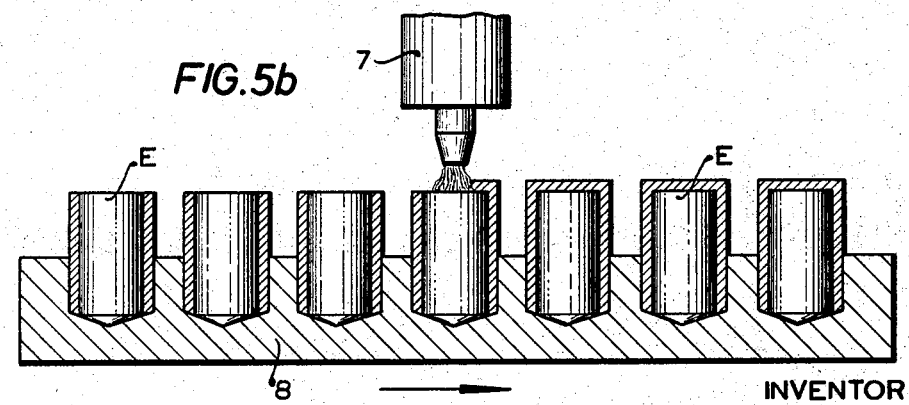
INVENTORS
Werner Oehler
Werner Müller
By

United States Patent Office 3,375,089
Patented Mar. 26, 1968

3,375,089
STEEL STUDS
Werner Oehler and Werner Müller, Gummersbach, Germany, assignors to L. & C. Steinmuller G.m.b.H., Gummersbach, Germany
Filed June 17, 1965, Ser. No. 464,688
Claims priority, application Germany, June 23, 1964, St 22,295
7 Claims. (Cl. 29—183)

The present invention relates to steel pins or studs for studding boiler pipes and also concerns a method of making such pins or studs.

In order to obtain a high scale resistance and a high wear resistance, heretofore, studs of high alloy steel have been welded onto boiler pipes. The thus obtained welding connections, however, are relatively poor and, in particular, are brittle and, therefore, can easily be knocked off, e.g. when transporting and installing boiler pipes with studs of the above mentioned type. A good welding connection between studs of the general type involved and boiler pipes can be obtained only with studs of a non-alloyed steel or of a steel which is only slightly alloyed. In such an instance, however, any material scale resistance as well as wear resistance is missing.

It is, therefore, an object of this invention to provide a steel stud, especially for studding boiler pipes, which will overcome the above mentioned drawbacks.

It is another object of this invention to provide a steel stud which will permit a good and durable welding connection thereof with a boiler pipe while simultaneously assuring high wear resistance and scale resistance in the presence of high temperatures and fire gases in a boiler firing system.

These and other objects and advantages of the invention will appear more clearly from the following specification in connection with the accompanying drawings in which:

FIGURE 5 illustrates a step in a modified method of making studs according to the present invention.

FIGURE 5a shows a process step following the method step of FIG. 5.

FIGURE 5b illustrates a method step following that of FIG. 5a.

A steel stud according to the present invention, especially for studding boiler pipes, is characterized primarily in that it comprises a core of non-alloyed or only slightly alloyed steel and a cover of highly alloyed steel. By an "only slightly alloyed" steel is meant a steel in which the total of the alloying ingredients do not exceed 20% by weight of the total weight of the stud or stud material.

As a suitable composition of a non-alloyed steel for use as core in a stud according to the present invention may be mentioned:

C ------------------------------------------------ 0.16
$Si_{max.}$ -------------------------------------- 0.35
$Mn_{min.}$ -------------------------------------- 0.40
$P_{max.}$ --------------------------------------- 0.05
$S_{max.}$ --------------------------------------- 0.05

A suitable only slightly alloyed steel for the core of a stud according to the present invention may consist of:

C ------------------------------------------------ 0.12
Si ----------------------------------------------- 0.15
Mn ----------------------------------------------- 0.50
$P_{max.}$ --------------------------------------- 0.04
$S_{max.}$ --------------------------------------- 0.04
Mo ----------------------------------------------- 0.25

A suitable cover of highly alloyed steel may consist of:

$C_{max.}$ --------------------------------------- 0.12
Si ----------------------------------------------- 1.2
$Mn_{max.}$ -------------------------------------- 1.0
Al ----------------------------------------------- 1.2
Cr ----------------------------------------------- 23.0

Figure 1:
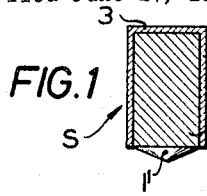
FIGURE 1 illustrates a longitudinal section through a stud according to the present invention.
Figure 2:
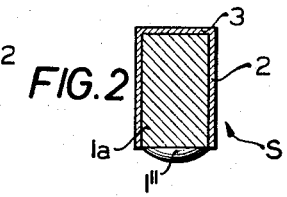
FIGURE 2 is a longitudinal section through a stud differing from that of FIG. 1 in that the welding end is spherical rather than conical.
Figure 3:
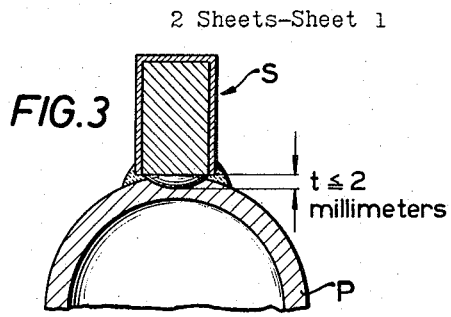
FIGURE 3 represents a partial cross section through a boiler pipe with a stud according to the invention welded thereto.

Referring now to the drawings in detail, the stud according to the invention as illustrated in FIG. 1 is generally designated S and comprises a core 1 of a non-alloyed or only slightly alloyed steel and a cover 2 of a high alloy steel. That end of stud S which is to be welded to a boiler pipe P (see FIG. 3) is designated with the reference numeral 1' and according to FIG. 1 is of conical shape. That end face of stud S which is opposite the conical portion 1' is covered by a scale resistant cover or coating 3 which may consist of the same high alloy steel as cover 2. Stud S' shown in FIG. 2 differs from that of FIG. 1 merely in that the end 1" which is to be welded to pipe P is spherical. As will be seen from FIG. 3, the high alloy steel cover 2 will with the stud in welded-on condition extend up to the outer spherical surface of pipe P. Thus, the entire outer surface of the stud is characterized by a high scale resistance. FIG. 3 also illustrates to which extent the welding end 1' or 1" of stud S when welded to pipe P has entered the wall of pipe P.

While studs of the present invention may be made in any desired size, usually the studs have a diameter of from 8 to 12 millimeters and a length of from 10 to 20 millimeters. The thickness of the high alloy steel cover may e.g. be from 0.1 to 2 millimeters.

Figure 4:
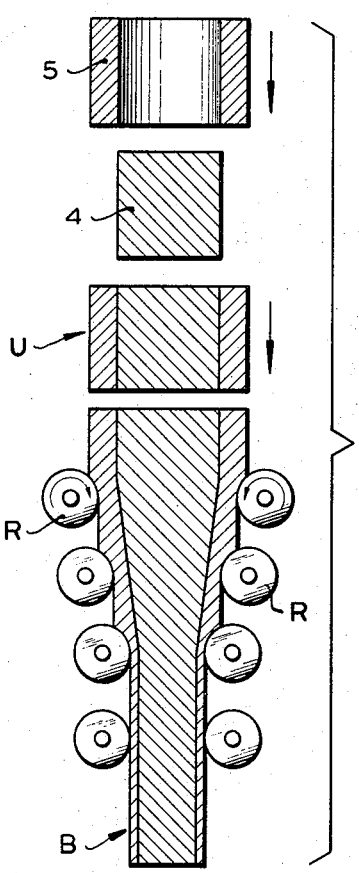
FIGURE 4 illustrates various phases of a method of making a stud according to the present invention.

A stud according to the present invention may be made in various ways. According to one method of the present invention, a core of a non-alloyed or only slightly alloyed steel is prepared in the form of a block 4 as shown in FIG. 4. Furthermore, a sleeve 5 is prepared of a high alloy steel as likewise shown in FIG. 4. Sleeve 5 is then shrunk upon block 4. The two members 4 and 5 thus form a unit generally designated U which is then in customary manner in a rolling process (indicated by the rollers R) rolled into bar stock indicated by the letter B. This bar stock which may have any desired cross section, e.g. circular cross section or rectangular cross section, may then be cut up into studs of desired length in the manner shown, e.g. in FIG. 5a. The cutting tool employed for this purpose is preferably so shaped that the welding end 1' will at the end of the cutting operation have the desired conical or if preferred spherical shape, whereas that end face of the stud which is opposite said welding end is straight. Since in this condition end face E is not scale resistant, the cut-off studs are preferably inserted in corresponding holes in a plate 8, whereupon by means of a spraying device 7 high alloy steel is sprayed upon end faces E as shown in FIG. 5b.

Instead of making studs according to the present invention in conformity with the method described in connection with FIG. 4, it is also possible to spray high alloy steel onto a core in the form of a bar of non-alloyed or only slightly alloyed steel. such a method is illustrated in FIG. 5 in which a spraying device 7 is moved along a rotating bar 6 of non-alloyed or only slightly alloyed steel while spraying thereon a layer 2 of high alloy steel. The thus obtained bar may then be cut to studs as described above in connection with FIG. 5a, and the end faces E may subsequently be covered with a layer of a high alloy steel as described above in connection with FIG. 5b.

Figure 6:
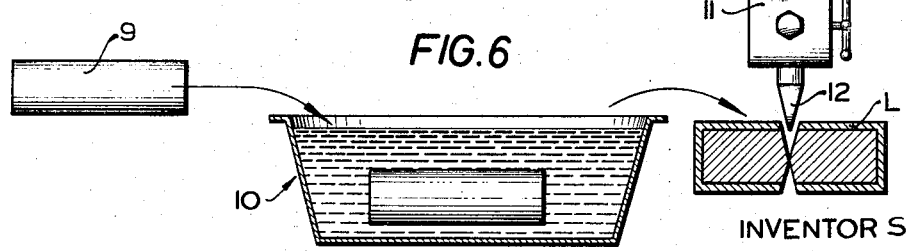
FIGURE 6 illustrates still another method of making a stud according to the present invention.

Still another method of making studs of the present invention is illustrated in FIG. 6. According to this method sections 9 having about twice the length of the desired final stud are cut from a bar of non-alloyed or only slightly alloyed steel. These sections are then passed through a chromium bath 10 where they are covered by a high alloy steel layer L. Finally, each section is cut into half by a cutting device 11 having a cutting tool 12 of such a shape that the welding ends will have the desired shape, e.g. a conical shape.

It is, of course, to be understood that the present invention is, by no means, limited to the particular studs and methods of making same as described above but also comprises any modifications within the scope of the appended claims.

What we claim is:

1. A steel stud, especially for studding boiler pipes, which comprises: a core of substantially non-alloyed steel and a cover of high alloy steel.

2. A steel stud, especially for studding boiler pipes, which comprises: a core of a substantially non-alloyed steel, and a cover of a high alloy steel covering all of said core with the exception of one end face thereof.

3. A steel stud, especially for studding boiler pipes, which comprises: a steel core with alloying ingredients within the range of from 0 to 20 percent by weight of the total weight of the steel, and a cover of a high alloy steel covering all sides of said stud with the exception of one end face thereof.

4. A steel stud, especially for studding boiler pipes, which comprises: a steel core having two oppositely located end faces and a cover covering all of said core with the exception of one of said end faces, said cover being of a high alloy steel containing at least 1 percent more alloying ingredients than said core.

5. A steel stud according to claim 4, in which said one end face is conical.

6. A steel stud according to claim 4, in which said one end face is spherical.

7. In combination with a boiler pipe: a steel stud having a steel core with one end face thereof welded to said boiler pipe and having a cover of steel extending over all of the surfaces of said core with the exception of said one end face, said cover containing at least 1 percent more alloying ingredients than said core and extending up to the outer surface of said pipe.

References Cited

UNITED STATES PATENTS

| | | | |
|---|---|---|---|
| 1,306,690 | 6/1919 | Gillespie | 29—196.1 |
| 2,046,914 | 7/1936 | Kormann et al. | 29—183 |
| 2,161,905 | 6/1939 | Watson | 29—191 |
| 3,148,954 | 9/1964 | Haas | 29—196.1 |

DAVID L. RECK, *Primary Examiner.*

RICHARD O. DEAN, *Examiner.*